US012728465B2

(12) United States Patent
Takahashi

(10) Patent No.: US 12,728,465 B2
(45) Date of Patent: Sep. 8, 2026

(54) DRILL

(71) Applicant: Sumitomo Electric Hardmetal Corp., Itami (JP)

(72) Inventor: Koji Takahashi, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 483 days.

(21) Appl. No.: 18/288,383

(22) PCT Filed: Jan. 12, 2023

(86) PCT No.: PCT/JP2023/000637
§ 371 (c)(1),
(2) Date: Oct. 26, 2023

(87) PCT Pub. No.: WO2024/150374
PCT Pub. Date: Jul. 18, 2024

(65) Prior Publication Data

US 2025/0083237 A1 Mar. 13, 2025

(51) Int. Cl.
*B23B 51/02* (2006.01)

(52) U.S. Cl.
CPC .......... *B23B 51/02* (2013.01); *B23B 2251/04* (2013.01); *B23B 2251/14* (2013.01)

(58) Field of Classification Search
CPC ..... B23B 51/02; B23B 51/00; B23B 2251/04; B23B 2251/00; B23B 2251/14; B23B 2251/182; B23B 2251/18
USPC ......... 408/199, 407, 227, 229, 56, 204, 207, 408/230
See application file for complete search history.

(56) References Cited

U.S. PATENT DOCUMENTS 4,759,667 A 7/1988 Brown
5,716,172 A * 2/1998 Nakamura .............. B23B 51/02 408/230
5,846,035 A * 12/1998 Karafillis ................ B23B 51/02 408/230
6,585,460 B1 * 7/2003 Meece .................... B23B 51/02 451/48
2017/0274460 A1 * 9/2017 Jindai ..................... B23B 51/02
2019/0232383 A1 * 8/2019 Nakata .................... B23B 51/02
2020/0324348 A1 10/2020 Yoshioka

FOREIGN PATENT DOCUMENTS

JP S60-114407 A 6/1985
JP H05-029615 U 4/1993
JP H07-040015 U 7/1995
JP 2000-271811 A 10/2000

(Continued)

*Primary Examiner* — Lawrence Averick
(74) *Attorney, Agent, or Firm* — XSENSUS LLP

(57) ABSTRACT

A first flank face includes a first front flank face portion and a first rear flank face portion. A second flank face includes a second front flank face portion and a second rear flank face portion. A ridgeline between the first front flank face portion and the first rear flank face portion is defined as a first ridgeline. A ridgeline between the second front flank face portion and the second rear flank face portion is defined as a second ridgeline. When viewed in the axial direction, a distance between the first ridgeline and the second ridgeline in a direction perpendicular to the first ridgeline is greater than 0 mm and less than or equal to 0.03 mm.

19 Claims, 16 Drawing Sheets

(56) References Cited

FOREIGN PATENT DOCUMENTS

| | | | |
|---|---|---|---|
| JP | 2003-025125 | A | 1/2003 |
| JP | 2003-266223 | A | 9/2003 |
| JP | 2003-266225 | A | 9/2003 |
| JP | 2009-023055 | A | 2/2009 |
| JP | 2019005882 | A | 1/2019 |
| JP | 2021-003773 | A | 1/2021 |
| WO | 2009/001681 | A1 | 12/2008 |
| WO | 2012070640 | A1 | 5/2012 |
| WO | 2017/179689 | A1 | 10/2017 |
| WO | 2019/054289 | A1 | 3/2019 |

* cited by examiner 100
10
11
12
71
72
20
22
21
52
62
61
51
26
9
28
13
16
9
18
29
27
17
19

19
26
51
91
118
θ 11
131
18
FORWARD IN ROTATION DIRECTION
REARWARD IN ROTATION DIRECTION
71
11
12
10
16

HOLE DIAMETER ENLARGEMENT [mm]

0.03
0.02
0.01
0

P8
P9
P10
P11
P12
P13

0
0.04
0.08
0.10
0.12

SECOND DISTANCE [mm]

DRILL

CROSS-REFERENCE TO RELATED APPLICATION

The present application is based on PCT filing PCT/JP2023/000637, filed Jan. 12, 2023, the entire contents of which are incorporated herein by reference.

TECHNICAL FIELD

The present disclosure relates to a drill.

BACKGROUND ART

WO 2017/179689 A (PTL 1) describes a drill including two tip flank faces. The tip flank faces include a first tip flank face and a second tip flank face. When viewed from the tip side in the axial direction, an intersecting ridgeline between the first tip flank face and the second tip flank face is linear. When viewed from the tip side in the axial direction, a distance between an extended line of the intersecting ridgeline on one of the two tip flank faces toward the other tip flank face and the intersecting ridgeline is within a range of 0.04 mm to 0.08 mm.

CITATION LIST

Patent Literature

PTL 1. WO 2017/179689 A

SUMMARY OF THE INVENTION

A drill according to the present disclosure rotates around an axis, and includes a first flank face, a first thinning face, a second flank face, and a second thinning face. The first thinning face is provided rearwardly of the first flank face in the rotation direction. The second flank face is provided rearwardly of the first thinning face in the rotation direction. The second thinning face is provided rearwardly of the second flank face in the rotation direction. The first flank face includes a first front flank face portion and a first rear flank face portion. The first rear flank face portion is contiguous to the first front flank face portion. The first rear flank face portion is inclined with respect to the first front flank face portion. The first rear flank face portion is provided rearwardly of the first front flank face portion in the rotation direction. The second flank face includes a second front flank face portion and a second rear flank face portion. The second rear flank face portion is contiguous to the second front flank face portion. The second rear flank face portion is inclined with respect to the second front flank face portion. The second rear flank face portion is provided rearwardly of the second front flank face portion in the rotation direction. The second front flank face portion is contiguous to each of the first front flank face portion and the first rear flank face portion. The second rear flank face portion is contiguous to the first front flank face portion. A ridgeline between the first front flank face portion and the first rear flank face portion is defined as a first ridgeline. A ridgeline between the second front flank face portion and the second rear flank face portion is defined as a second ridgeline. When viewed in the axial direction from a front end toward a rear end of the drill, a distance between the first ridgeline and the second ridgeline in a direction perpendicular to the first ridgeline is greater than 0 mm and less than or equal to 0.03 mm. A ridgeline between the first front flank face portion and the second rear flank face portion constitutes a first chisel region. A ridgeline between the first rear flank face portion and the second front flank face portion constitutes a second chisel region. A ridgeline between the first front flank face portion and the second front flank face portion constitutes a third chisel region. The third chisel region is contiguous to each of the first chisel region and the second chisel region. The third chisel region is provided at the front end. A ridgeline between the first thinning face and the first flank face and a ridgeline between the first thinning face and the second flank face constitute a first thinning ridgeline. A ridgeline between the second thinning face and the first flank face and a ridgeline between the second thinning face and the second flank face constitute a second thinning ridgeline. When viewed in the axial direction, the shortest distance between the first thinning ridgeline and the second thinning ridgeline in a direction perpendicular to the first ridgeline is greater than or equal to 0.04 mm and less than or equal to 0.10 mm.

BRIEF DESCRIPTION OF DRAWINGS

FIG. 7 is an enlarged schematic view illustrating a region VII in FIG. 6.

FIG. 10 is a schematic cross-sectional view illustrating a state immediately before the drill penetrates a workpiece.

FIG. 11 is a schematic cross-sectional view illustrating a state in which a hole is formed in the workpiece using the drill.

FIG. 12 is an enlarged schematic front view illustrating a configuration of a drill according to Sample 1.

FIG. 13 illustrates hole diameter enlargements of Samples 8 to 13.

DETAILED DESCRIPTION

Figure 1:
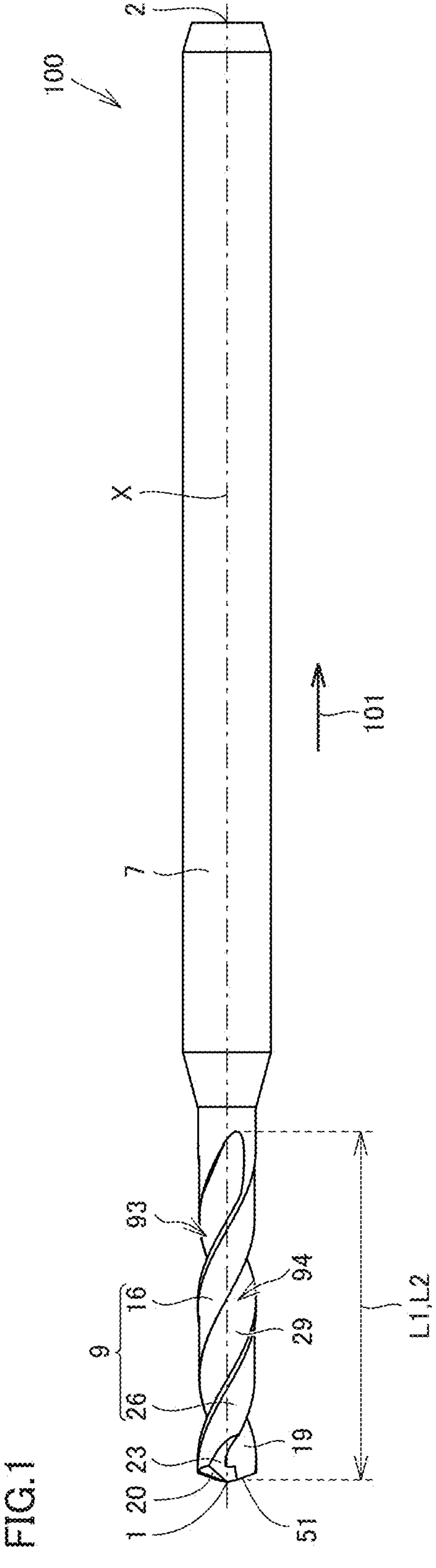
FIG. 1 is a schematic plan view illustrating a configuration of a drill according to an embodiment.

Problem to be Solved by the Present Disclosure

An object of the present disclosure is to provide a drill capable of improving the accuracy of drilling and improving the strength of the drill.

Advantageous Effect of the Present Disclosure

The present disclosure can provide a drill capable of improving the accuracy of drilling and improving the strength of the drill.

Description of Embodiments

First, an overview of an embodiment of the present disclosure will be described.

(1) A drill 100 according to the present disclosure rotates around an axis X. and includes a first flank face 10, a first thinning face 13, a second flank face 20, and a second thinning face 23. First thinning face 13 is provided rearwardly of first flank face 10 in the rotation direction. Second flank face 20 is provided rearwardly of first thinning face 13 in the rotation direction. Second thinning face 23 is provided rearwardly of second flank face 20 in the rotation direction. First flank face 10 includes a first front flank face portion 11 and a first rear flank face portion 12. First rear flank face portion 12 is contiguous to first front flank face portion 11. First rear flank face portion 12 is inclined with respect to first front flank face portion 11. First rear flank face portion 12 is provided rearwardly of first front flank face portion 11 in the rotation direction. Second tank face 20 includes a second front flank face portion 21 and a second rear flank face portion 22. Second rear flank face portion 22 is contiguous to second front flank face portion 21. Second rear flank face portion 22 is inclined with respect to second front flank face portion 21. Second rear flank face portion 22 is provided rearwardly of second front flank face portion 21 in the rotation direction Second front flank face portion 21 is contiguous to each of first front flank face portion 11 and first rear flank face portion 12. Second rear flank face portion 22 is contiguous to first front flank face portion 11. A ridgeline between first front flank face portion 11 and first rear flank face portion 12 is defined as a first ridgeline 71. A ridgeline between second front flank face portion 21 and second rear flank face portion 22 is defined as a second ridgeline 72. When viewed in axial direction 101 from a front end 1 toward a rear end 2 of drill 100, a distance E1 between first ridgeline 71 and second ridgeline 72 in a direction perpendicular to first ridgeline 71 is greater than 0 mm and less than or equal to 0.03 mm. A ridgeline between first front flank face portion 11 and second rear flank face portion 22 constitutes a first chisel region 41. A ridgeline between first rear flank face portion 12 and second front flank face portion 21 constitutes a second chisel region 42. A ridgeline between first front flank face portion 11 and second front flank face portion 21 constitutes a third chisel region 43. Third chisel region 43 is contiguous to each of first chisel region 41 and second chisel region 42. Third chisel region 43 is provided at front end 1. A ridgeline between first thinning face 13 and first flank face 10 and a ridgeline between first thinning face 13 and second flank face 20 constitute a first thinning ridgeline 15. A ridgeline between second thinning face 23 and first flank face 10 and a ridgeline between second thinning face 23 and second flank face 20 constitute a second thinning ridgeline 25. When viewed in axial direction 101, a shortest distance E2 between first thinning ridgeline 15 and second thinning ridgeline 25 in a direction perpendicular to first ridgeline 71 is greater than or equal to 0.04 mm and less than or equal to 0.10 mm.

(2) in drill 100 according to (1), third chisel region 43 may have a length L3 that is greater than or equal to 23% and less than or equal to 55% of shortest distance E2 as viewed in axial direction 101.

(3) In drill 100 according to (1) or (2), drill 100 may have an edge diameter D of less than or equal to 3 mm.

(4) Drill 100 according to (3) may include a first chip discharge face 19 and a second chip discharge face 29. First chip discharge face 19 may be helically provided around axis X. First chip discharge face 19 may be contiguous to first flank face 10. Second chip discharge face 29 may be helically provided around axis X. Second chip discharge face 29 may be contiguous to second flank face 20. Each of first chip discharge face 19 and second chip discharge face 29 constitutes a chip discharge flute. The length of each of first chip discharge face 19 and second chip discharge face 29 in axial direction 101 may be greater than or equal to 2 times and less than or equal to 10 times edge diameter D.

(5) In drill 100 according to (4), a ridgeline between first flank face 10 and first chip discharge face 19 may constitute a first cutting edge 51. A ridgeline between second flank face 20 and second chip discharge face 29 may constitute a second cutting edge 52. A rake angle θ11 of first cutting edge 51 in the radial direction of drill 100 at an outermost peripheral end 91 of first cutting edge 51 may be greater than or equal to −18° and less than or equal to −9°. A rake angle θ12 of second cutting edge 52 in the radial direction of drill 100 at an outermost peripheral end 92 of second cutting edge 52 may be greater than or equal to −18° and less than or equal to −9°.

(6) In drill 100 according to any one of (1) to (5), an angle θ3 formed by first ridgeline 71 and third chisel region 43 as viewed in axial direction 101 may be larger than an angle θ1 formed by first ridgeline 71 and first chisel region 41 and larger than an angle θ2 formed by first ridgeline 71 and second chisel region 42.

(7) In drill 100 according to any one of (1) to (6), angle θ3 formed by first ridgeline 71 and third chisel region 43 as viewed in axial direction 101 may be greater than or equal to 50° and less than or equal to 80°.

(8) In drill 100 according to any one of (1) to (7), angle θ1 formed by first ridgeline 71 and first chisel region 41 as viewed in axial direction 101 may be greater than or equal to 40° and less than or equal to 60°. An angle formed by first ridgeline 71 and second chisel region 42 as viewed in axial direction 101 may be greater than or equal to 40° and less than or equal to 60°.

DETAILED DESCRIPTION OF EMBODIMENTS

An embodiment (hereinafter also referred to as present embodiment) of the present disclosure will be described below in detail with reference to the drawings. The same or corresponding parts in the following drawings are denoted by the same reference signs, and the description thereof will not be repeated.

First, a configuration of drill 100 according to the present embodiment will be described. FIG. 1 is a schematic plan view illustrating the configuration of drill 100 according to the present embodiment. As illustrated in FIG. 1, drill 100 according to the present embodiment mainly includes front end 1, rear end 2, first cutting edge 51, first chip discharge face 19, second chip discharge face 29, an outer peripheral surface 9, a shank 7, second flank face 20, and second thinning face 23. Drill 100 according to the present embodiment is, for example, a drill for metal working.

As illustrated in FIG. 1, first chip discharge face 19 is helically provided around axis X. Second chip discharge face 29 is helically provided around axis X. Each of first chip discharge face 19 and second chip discharge face 29 constitutes a chip discharge flute. Specifically, first chip discharge face 19 constitutes a first chip discharge flute 93. Second chip discharge face 29 constitutes a second chip discharge flute 94.

Outer peripheral surface 9 is contiguous to each of first chip discharge face 19 and second chip discharge face 29. Outer peripheral surface 9 has a first outer peripheral surface portion 16 and a second outer peripheral surface portion 26. First outer peripheral surface portion 16 is helically provided around axis X. Second outer peripheral surface portion 26 is helically provided around axis X. First cutting edge 51 is provided at a position close to front end 1 of drill 100. Second thinning face 23 is contiguous to each of second flank face 20, second outer peripheral surface portion 26, and first chip discharge face 19.

Front end 1 of drill 100 faces a workpiece. Rear end 2 of drill 100 faces a tool spindle (not shown) that rotates drill 100. Shank 7 is a part attached to the tool spindle. Axis X passes through front end 1 and rear end 2. Drill 100 rotates about axis X. In the present specification, a direction from front end 1 toward rear end 2 is axial direction 101. Axial direction 101 is a direction along axis X. A direction perpendicular to axial direction 101 and approaching axis X is referred to as radially inward. On the contrary, a direction perpendicular to axial direction 101 and away from axis X is referred to as radially outward.

As illustrated in FIG. 1, the length of first chip discharge face 19 in axial direction 101 is defined as a first length L1 First length 1*l*, is, for example, 10 mm. The length of second chip discharge face 29 in axial direction 101 is defined as a second length L2. Second length L2 is substantially the same as first length L1.

Figure 2:
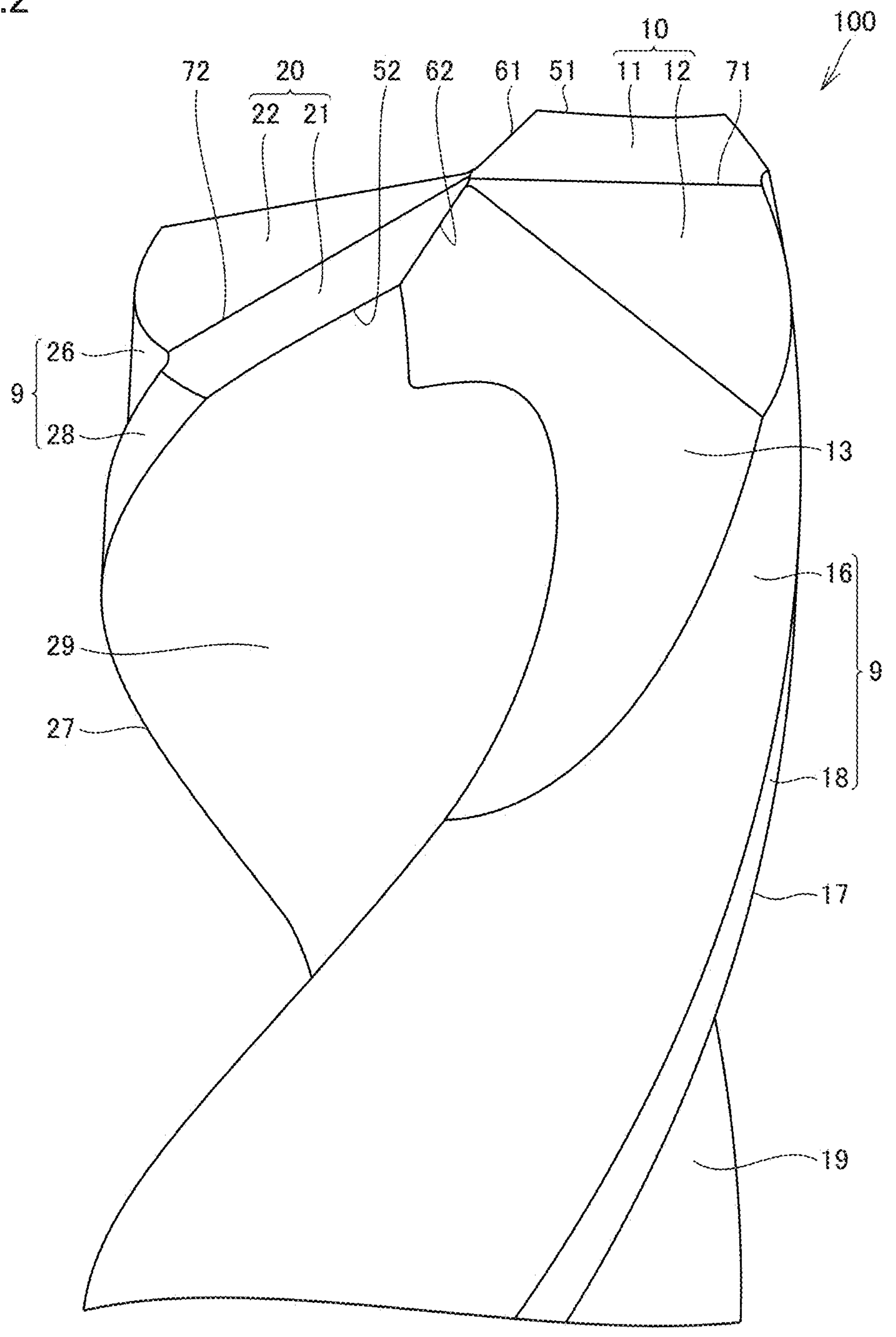
FIG. 2 is a schematic perspective view illustrating the configuration of the drill according to the embodiment.

FIG. 2 is a schematic perspective view illustrating the configuration of drill 100 according to the present embodiment. As illustrated in FIG. 2, drill 100 according to the present embodiment includes first flank face 10, first thinning face 13, and second cutting edge 52. First flank face 10 is contiguous to first chip discharge face 19 (see FIG. 1) and first outer peripheral surface portion 16. A ridgeline between first flank face 10 and first chip discharge face 19 constitutes first cutting edge 51. First chip discharge face 19 close to first cutting edge 51 functions as a rake face.

First thinning face 13 is contiguous to each of first flank face 10, first outer peripheral surface portion 16, and second chip discharge face 29. Second flank face 20 is contiguous to each of first flank face 10, first thinning face 13, and second chip discharge face 29. A ridgeline between second flank face 20 and second chip discharge face 29 constitutes second cutting edge 52. Second chip discharge face 29 close to second cutting edge 52 functions as a rake face.

As illustrated in FIG. 2, first flank face 10 has a first front flank face portion 11 and a first rear flank face portion 12. First front flank face portion 11 has, for example, a flat surface. First front flank face portion 11 is contiguous to first cutting edge 51. From another point of view, a ridgeline between first front flank face portion 11 and first chip discharge face 19 (see FIG. 1) constitutes first cutting edge 51. First tear flank face portion 12 has, for example, a flat surface. First rear flank face portion 12 is contiguous to first front flank face portion 11. A ridgeline between first front flank face portion 11 and first rear flank face portion 12 is defined as first ridgeline 71. First ridgeline 71 is, for example, linear.

Second flank face 20 includes second front flank face portion 21 and second rear flank face portion 22. Second front flank face portion 21 has, for example, a flat surface. Second front flank face portion 21 is contiguous to second cutting edge 52. Second front flank face portion 21 has, for example, a flat surface. Second rear flank face portion 22 is contiguous to second front flank face portion 21. A ridgeline between second front flank face portion 21 and second rear flank face portion 22 is defined as second ridgeline 72. Second ridgeline 72 is, for example, linear.

As illustrated in FIG. 2, outer peripheral surface 9 includes a first margin face 18 and a second margin face 28. From another point of view, drill 100 has only one pair of margin faces. First margin face 18 is contiguous to each of first outer peripheral surface portion 16 and first chip discharge face 19. A ridgeline between first margin face 18 and first chip discharge face 19 constitutes a first leading edge 17.

Second margin face 28 is contiguous to each of second outer peripheral surface portion 26, second flank face 20, and second chip discharge face 29. A ridgeline between second margin face 28 and second chip discharge face 29 constitutes a second leading edge 27.

First outer peripheral surface portion 16 is contiguous to each of first flank face 10, first thinning face 13, and second chip discharge face 29. Second outer peripheral surface portion 26 is contiguous to each of second flank face 20, second thinning face 23, and first chip discharge face 19.

Figure 3:
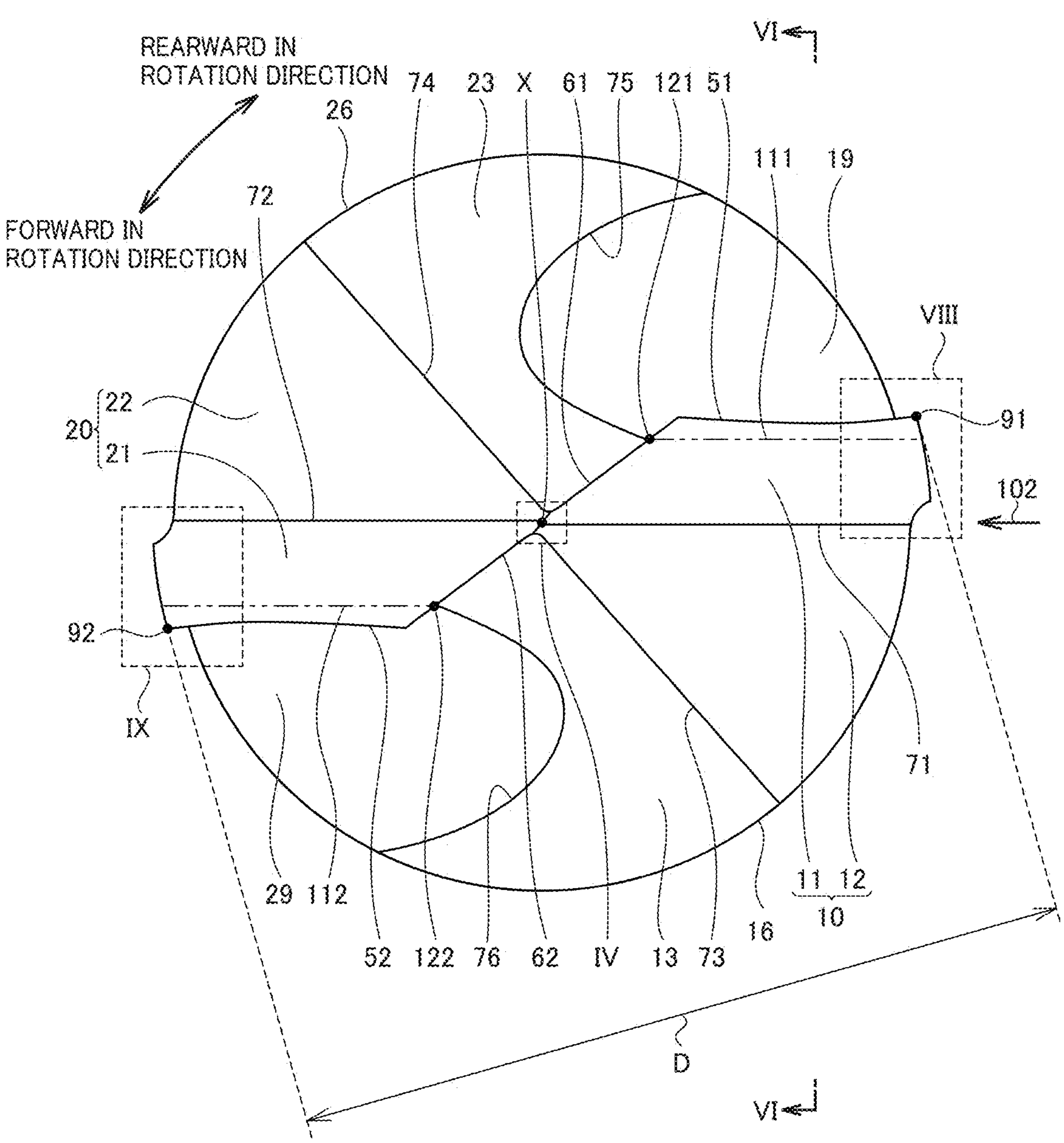
FIG. 3 is a schematic front view illustrating the configuration of the drill according to the embodiment.

FIG. 3 is a schematic front view illustrating the configuration of drill 100 according to the present embodiment. The schematic front view illustrated in FIG. 3 illustrates the configuration of drill 100 as viewed in axial direction 101. For convenience of description, shank 7 is not illustrated in FIG. 3. As illustrated in FIG. 3, first thinning face 13 is provided rearwardly of first flank face 10 in the rotation direction. Second flank face 20 is provided rearwardly of first thinning face 13 in the rotation direction. Second thinning face 23 is provided rearwardly of second flank face 20 in the rotation direction. First flank face 10 is provided rearwardly of second thinning face 23 in the rotation direction.

As illustrated in FIG. 3, drill 100 may be substantially two-fold rotationally symmetric with respect to axis X. The shape obtained by rotating the outer shape of first flank face 10 by 180° with respect to axis X may be substantially the same as the outer shape of second flank face 20. Similarly, the shape obtained by rotating the outer shape of first thinning face 13 by 180° with respect to axis X may be substantially the same as the outer shape of second thinning face 23. Second ridgeline 72 is substantially parallel to first ridgeline 71 as viewed in axial direction 101.

First front flank face portion 11 is contiguous to second thinning face 23. A ridgeline between first front flank face portion 11 and second thinning face 23 constitutes a first thinning cutting edge 61. First thinning cutting edge 61 is contiguous to first cutting edge 51. First thinning cutting edge 61 is provided radially inward with respect to first cutting edge 51. First front flank face portion 11 is separated from first thinning face 13.

First rear flank face portion 12 is provided rearwardly of first front flank face portion 11 in the rotation direction. First rear flank face portion 12 is contiguous to first thinning face 13. A ridgeline between first rear flank face portion 12 and first thinning face 13 is defined as a third ridgeline 73. First rear flank face portion 12 is separated from second thinning face 23.

Second front flank face portion 21 is contiguous to first thinning face 13. A ridgeline between second front flank face portion 21 and first thinning face 13 constitutes a second thinning cutting edge 62. Second thinning cutting edge 62 is contiguous to second cutting edge 52. Second thinning cutting edge 62 is provided radially inward with respect to second cutting edge 52. Second front flank face portion 21 is separated from second thinning face 23.

Second rear flank face portion 22 is provided rearwardly of second front flank face portion 21 in the rotation direction. Second rear flank face portion 22 is contiguous to second thinning face 23. A ridgeline between second rear flank face portion 22 and second thinning face 23 is defined as a fourth ridgeline 74. Second rear flank face portion 22 is separated from first thinning face 13.

As illustrated in FIG. 3, first outer peripheral surface portion 16 is provided radially outward with respect to first thinning face 13 as viewed in axial direction 101. Second outer peripheral surface portion 26 is provided radially outward with respect to second thinning face 23 as viewed in axial direction 101.

First cutting edge 51 has a curved shape as viewed in axial direction 101. Specifically, first cutting edge 51 may have an arc shape. First cutting edge 51 is recessed rearward in the rotation direction as viewed in axial direction 101. Second cutting edge 52 has a curved shape as viewed in axial direction 101. Specifically, second cutting edge 52 may have an arc shape Second cutting edge 52 is recessed rearward in the rotation direction as viewed in axial direction 101.

The outermost peripheral end of first cutting edge 51 is defined as a first outermost peripheral end 91. The outermost peripheral end of second cutting edge 52 is defined as a second outermost peripheral end 92. First outermost peripheral end 91, second outermost peripheral end 92, and axis X may be aligned on a straight line as viewed in axial direction 101. A distance between first outermost peripheral end 91 and axis X and a distance between second outermost peripheral end 92 and axis X are substantially the same as viewed in axial direction 101.

The distance between first outermost peripheral end 91 and second outermost peripheral end 92 as viewed in axial direction 101 is edge diameter D of drill 100. Edge diameter D is, for example, less than or equal to 3 mm. Edge diameter D is, for example, 2 mm. The upper limit of edge diameter D is not particularly limited, but may be, for example, less than or equal to 2 mm, or less than or equal to 1 mm. The lower limit of edge diameter 1) is not particularly limited, but may be, for example, greater than or equal to 0.1 mm, or greater than or equal to 0.5 mm.

The length (first length L1) of first chip discharge face 19 in axial direction 101 is, for example, greater than or equal to two times and less than or equal to ten times edge diameter D. First length L1 may be, for example, greater than or equal to three times and less than or equal to five times edge diameter D. The lower limit of first length L1 is not particularly limited, but may be, for example, greater than or equal to 2.5 times edge diameter D. or greater than or equal to 4 times edge diameter D. The upper limit of first length L1 is not particularly limited, but may be, for example, less than or equal to eight times edge diameter D. or less than or equal to six times edge diameter D.

The length (second length L2) of second chip discharge face 29 in axial direction 101 is, for example, greater than or equal to two times and less than or equal to ten times edge diameter D. Second length L2 may be, for example, greater than or equal to three times and less than or equal to five times edge diameter D. The lower limit of second length L2 is not particularly limited, but may be, for example, greater than or equal to 2.5 times edge diameter D, or greater than or equal to 4 times edge diameter D. The tipper limit of second length L2 is not particularly limited, but may be, for example, less than or equal to eight times edge diameter D, or less than or equal to six times edge diameter D.

As illustrated in FIG. 3, a ridgeline between first chip discharge face 19 and second thinning face 23 is defined as a fifth ridgeline 75. Fifth ridgeline 75 is recessed forward in the rotation direction as viewed in axial direction 101. Fifth ridgeline 75 overlaps first thinning cutting edge 61 at a first point 121 on first thinning cutting edge 61 as viewed in axial direction 101. From another point of view, fifth ridgeline 75 extends forward from first point 121 in the rotation direction with respect to first thinning cutting edge 61 as viewed in axial direction 101. A straight line passing through first point 121 and parallel to first ridgeline 71 as viewed in axial direction 101 is defined as a first imaginary line 111. First cutting edge 51 is provided forwardly of first imaginary line 111 in the rotation direction as viewed in axial direction 101.

As illustrated in FIG. 3, a ridgeline between second chip discharge face 29 and first thinning face 13 is defined as a sixth ridgeline 76. Sixth ridgeline 76 is recessed forward in the rotation direction as viewed in axial direction 101. Sixth ridgeline 76 overlaps second thinning cutting edge 62 at a second point 122 on second thinning cutting edge 62 as viewed in axial direction 101. From another point of view, sixth ridgeline 76 extends forward from second point 122 in the rotation direction with respect to second thinning cutting edge 62 as viewed in axial direction 101. A straight line passing through second point 122 and parallel to first ridgeline 71 as viewed in axial direction 101 is defined as a second imaginary line 112. Second cutting edge 52 is provided forwardly of second imaginary line 112 in the rotation direction as viewed in axial direction 101. As illustrated in FIG. 3, a direction radially inward and parallel to first ridgeline 71 as viewed in axial direction 101 is defined as a side view direction 102.

Figure 4:
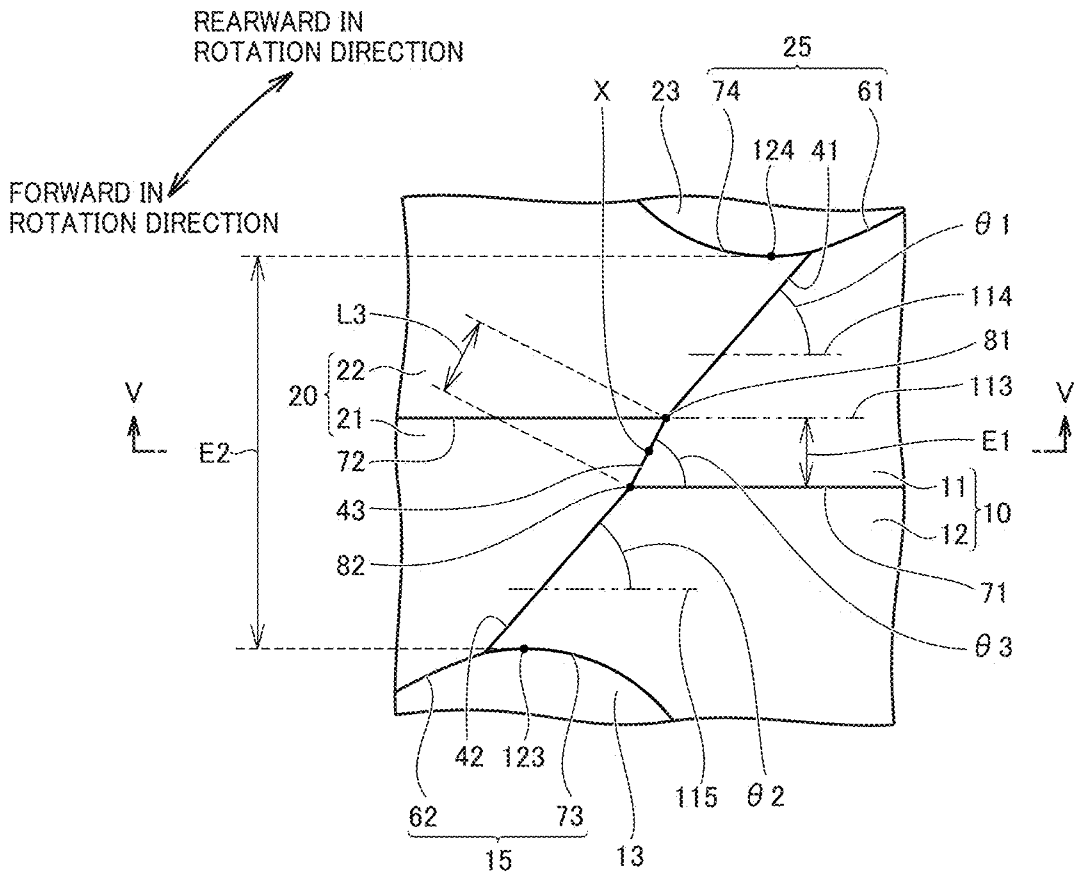
FIG. 4 is an enlarged schematic front view illustrating a region IV in FIG. 3.

FIG. 4 is an enlarged schematic front view illustrating a region IV in FIG. 3. As illustrated in FIG. 4, second front flank face portion 21 is contiguous to each of first front flank face portion 11 and first rear flank face portion 12. Second rear flank face portion 22 is contiguous to first front flank face portion 11. Second rear flank face portion 22 is separated from first rear flank face portion 12.

A ridgeline between first front flank face portion 11 and second rear flank face portion 22 constitutes first chisel region 41. First chisel region 41 is, for example, linear as viewed in axial direction 101. A ridgeline between first rear flank face portion 12 and second front flank face portion 21 constitutes second chisel region 42. Second chisel region 42 is, for example, linear as viewed in axial direction 101. Second chisel region 42 is spaced apart from first chisel region 41.

A ridgeline between first front flank face portion 1 and second front flank face portion 21 constitutes third chisel region 43. Third chisel region 43 may intersect axis X. Third chisel region 43 has a first end 81 and a second end 82. Third chisel region 43 is contiguous to each of first chisel region 41 and second ridgeline 72 at first end 81 Second end 82 is on the opposite side from first end 81. Third chisel region 43 is contiguous to each of second chisel region 42 and first ridgeline 71 at second end 82. Third chisel region 43 is provided radially inward with respect to first chisel region 41. Third chisel region 43 is provided radially inward with respect to second chisel region 42.

A straight line extending in a direction in which second ridgeline 72 extends as viewed in axial direction 101 is defined as a third imaginary line 113. Third imaginary line 113 is provided forwardly of first ridgeline 71 in the rotation direction as viewed in axial direction 101. A distance between first ridgeline 71 and second ridgeline 72 in a direction perpendicular to first ridgeline 71 as viewed in axial direction 101 is a first distance E1 First distance E1 is a distance between third imaginary line 113 and first ridgeline 71 as viewed in axial direction 101. First distance E1 is greater than 0 mm and less than or equal to 0.03 mm. The lower limit of first distance E1 is not particularly limited, but may be, for example, greater than or equal to 0.005 mm, or greater than or equal to 0.01 mm. The upper limit of first distance E1 is not particularly limited, but may be, for example, less than or equal to 0.027 mm, or less than or equal to 0.023 mm.

As illustrated in FIG. 4, a ridgeline (third ridgeline 73) between first thinning face 13 and first flank face 10 and a ridgeline (second thinning cutting edge 62) between first thinning face 13 and second flank face 20 constitute first thinning ridgeline 15. First thinning ridgeline 15 is contiguous to second chisel region 42. First thinning ridgeline 15 is recessed radially inward as viewed in axial direction 101. A point located on first thinning ridgeline 15 and closest to axis X in a direction perpendicular to first ridgeline 71 as viewed in axial direction 101 is a third point 123. Third point 123 is located on, for example, third ridgeline 73.

A ridgeline (first thinning cutting edge 61) between second thinning face 23 and first flank face 10 and a ridgeline (fourth ridgeline 74) between second thinning face 23 and second flank face 20 constitute second thinning ridgeline 25. Second thinning ridgeline 25 is contiguous to first chisel region 41. Second thinning ridgeline 25 is recessed radially inward as viewed in axial direction 101. A point located on second thinning ridgeline 25 and closest to axis X in a direction perpendicular to first ridgeline 71 as viewed in axial direction 101 is a fourth point 124. Fourth point 124 is located on, for example, fourth ridgeline 74.

A distance between third point 123 and fourth point 124 in a direction perpendicular to first ridgeline 71 as viewed in axial direction 101 is a second distance E2 When viewed in axial direction 101, second distance E2 is the shortest distance between first thinning ridgeline 15 and second thinning ridgeline 25 in a direction perpendicular to first ridgeline 71. Second distance E2 is greater than or equal to 0.04 mm and less than or equal to 0.10 mm. The lower limit of second distance E2 is not particularly limited, but may be, for example, greater than or equal to 0.05 mm, or greater than or equal to 0.053 mm. The upper limit of second distance E2 is not particularly limited, but may be, for example, less than or equal to 0.09 mm, or less than or equal to 0.085 mm. Second distance E2 is larger than first distance E1.

The length of third chisel region 43 in axial direction 101 is defined as a third length L3 From another point of view, third length L3 is a distance between first end 81 and second end 82 as viewed in axial direction 101. Third length L3 is greater than or equal to 23% and less than or equal to 55% of second distance E2. In other words, the percentage (first value) of the value obtained by dividing third length L3 by second distance E2 is greater than or equal to 23% and less than or equal to 55%. The lower limit of the first value is not particularly limited, but may be, for example, greater than or equal to 28%, or greater than or equal to 35%. The upper limit of the first value is not particularly limited, but may be, for example, less than or equal to 50%, or less than or equal to 45%.

As illustrated in FIG. 4, a straight line parallel to first ridgeline 71 and intersecting first chisel region 41 as viewed in axial direction 101 is defined as a fourth imaginary line 114. An angle which is an acute angle among angles formed by fourth imaginary line 114 and first chisel region 41 as viewed in axial direction 101 is defined as a first angle θ1. From another point of view, first angle θ1 is an angle formed by first ridgeline 71 and first chisel region 41 as viewed in axial direction 101.

First angle θ1 is, for example, greater than or equal to 40° and less than or equal to 60°. The lower limit of first angle θ1 is not particularly limited, but may be, for example, greater than or equal to 43°, or greater than or equal to 47°. The upper limit of first angle θ1 is not particularly limited, but may be, for example, less than or equal to 57°, or less than or equal to 53°.

As illustrated in FIG. 4, a straight line parallel to first ridgeline 71 and intersecting second chisel region 42 as viewed in axial direction 101 is defined as a fifth imaginary line 115. An angle which is an acute angle among angles formed by fifth imaginary line 115 and second chisel region 42 as viewed in axial direction 101 is defined as a second angle θ2. From another point of view, second angle θ2 is an angle formed by first ridgeline 71 and second chisel region 42 as viewed in axial direction 101.

Second angle θ2 is, for example, greater than or equal to 40° and less than or equal to 60°. The lower limit of second angle θ2 is not particularly limited, but may be, for example, greater than or equal to 43°, or greater than or equal to 47°. The upper limit of second angle 82 is not particularly limited, but may be, for example, less than or equal to 57°, or less than or equal to 53°.

An angle formed by first ridgeline 71 and third chisel region 43 as viewed in axial direction 101 is defined as a third angle θ3. Third angle θ3 is an acute angle. Third angle θ3 is larger than first angle θ1. From another point of view, first chisel region 41 is inclined rearward in the rotation direction with respect to third chisel region 43 as viewed in axial direction 101. Third angle 83 is larger than second angle 82. From another point of view, second chisel region 42 is inclined rearward in the rotation direction with respect to third chisel region 43 as viewed in axial direction 101.

Third angle θ3 is, for example, greater than or equal to 50° and less than or equal to 80°. The lower limit of third angle θ3 is not particularly limited, but may be, for example, greater than or equal to 55°, or greater than or equal to 60°. The upper limit of third angle θ3 is not particularly limited, but may be, for example, less than or equal to 75°, or less than or equal to 70°.

Figure 5:
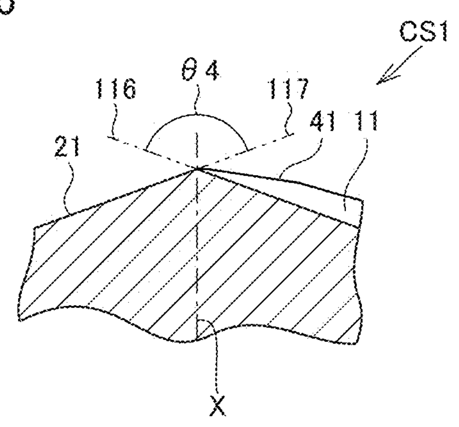
FIG. 5 is a schematic cross-sectional view taken along line V-V in FIG. 4.

FIG. 5 is a schematic cross-sectional view taken along line V-V in FIG. 4. FIG. 5 illustrates a cross section including axis X and parallel to first ridgeline 71 as viewed in axial direction 101. In the present specification, the cross section including axis X and parallel to first ridgeline 71 as viewed in axial direction 101 is defined as a first cross section CS1. In first cross section CS1, first front flank face portion 11 is linear, for example, as illustrated in FIG. 5. In first cross section CS1, a straight line extending in a direction in which first front flank face portion 11 extends is defined as a sixth imaginary line 116. In first cross section CS1, second front flank face portion 21 is linear, for example. In first cross section CS1, a straight line extending in a direction in which second front flank face portion 21 extends is defined as a seventh imaginary line 117.

An angle which is an obtuse angle among angles formed by sixth imaginary line 116 and seventh imaginary line 117 is a fourth angle θ4. Fourth angle θ4 is an angle formed by first front flank face portion 11 and second front flank face portion 21. Fourth angle θ4 is a tip angle of drill 100. Fourth angle θ4 is, for example, 140°. Fourth angle 84 is, for example, greater than or equal to 120° and less than or equal to 160°. In first cross section CS1, axis X substantially bisects an angle formed by first front flank face portion 11 and second front flank face portion 21.

Figure 6:
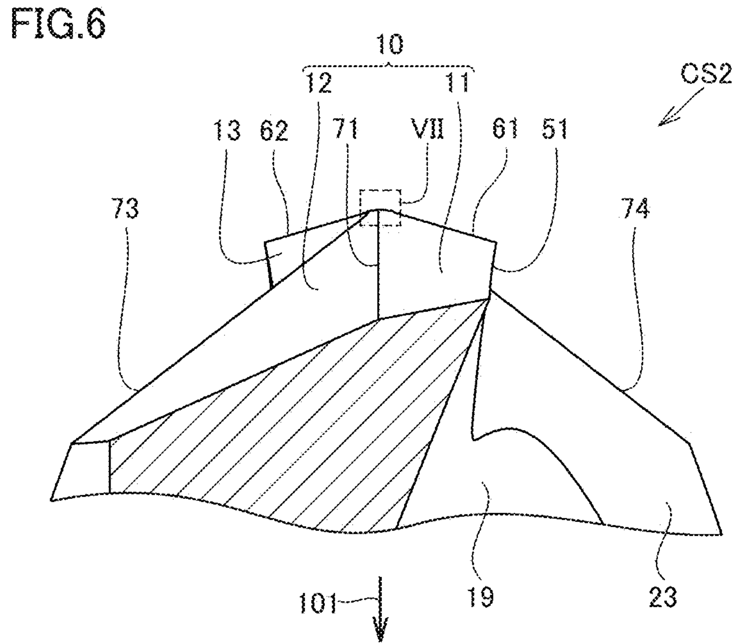
FIG. 6 is a schematic cross-sectional view taken along line VI-VI in FIG. 3.

FIG. 6 is a schematic cross-sectional view taken along line VI-VI in FIG. 3. The cross section illustrated in FIG. 6 is parallel to axis X and intersects first ridgeline 71. When viewed in axial direction 101, the cross section illustrated in FIG. 6 is perpendicular to first ridgeline 71. From another point of view, the schematic cross-sectional view of FIG. 6 illustrates the configuration of drill 100 as viewed in side view direction 102 (see FIG. 3). In the present specification, the cross section parallel to axis X and intersecting first ridgeline 71 is defined as a second cross section CS2.

As illustrated in FIG. 6, first rear flank face portion 12 is inclined with respect to first front flank face portion 11. Specifically, in second cross section CS2, first rear flank face portion 12 is inclined in axial direction 101 with respect to first front flank face portion 11. Similarly, second rear flank face portion 22 (see FIG. 3) is inclined with respect to second front flank face portion 21 (see FIG. 3).

In second cross section CS2, each of first front flank face portion 11 and first rear flank face portion 12 may be linear as illustrated in FIG. 6. Similarly, in the cross section parallel to axis X and intersecting second ridgeline 72 (see FIG. 31, each of second front flank face portion 21 and second front flank face portion 21 may be linear.

Figure 7:
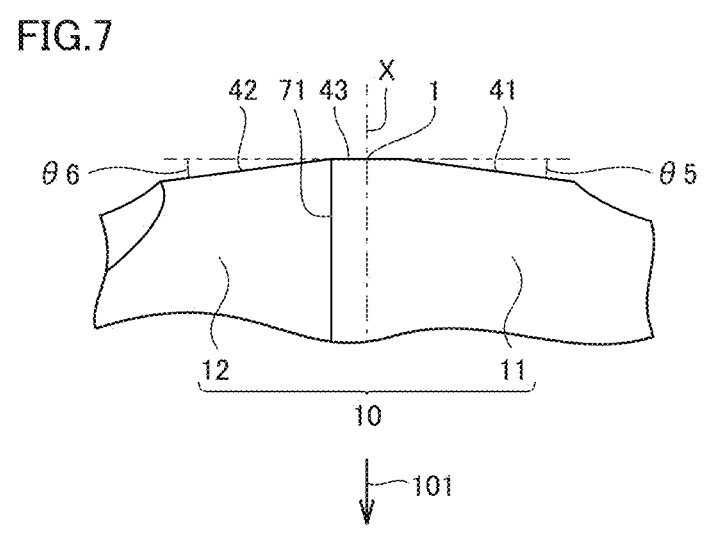

FIG. 7 is an enlarged schematic view illustrating a region VII in FIG. 6. As illustrated in FIG. 7, third chisel region 43 is provided at front end 1 of drill 100. Third chisel region 43 is substantially perpendicular to axis X as viewed in side view direction 102. As viewed in side view direction 102, first chisel region 41 is inclined in axial direction 101 with respect to third chisel region 43. As viewed in side view direction 102, the inclination angle of first chisel region 41 with respect to third chisel region 43 is a fifth angle θ5. Fifth angle θ5 is, for example, greater than or equal to 3° and less than or equal to 15°.

As viewed in side view direction 102, second chisel region 42 is inclined in axial direction 101 with respect to third chisel region 43. As viewed in side view direction 102, the inclination angle of second chisel region 42 with respect to third chisel region 43 is a sixth angle θ6. Sixth angle θ6 is, for example, greater than or equal to 3° and less than or equal to 15°.

Figure 8:
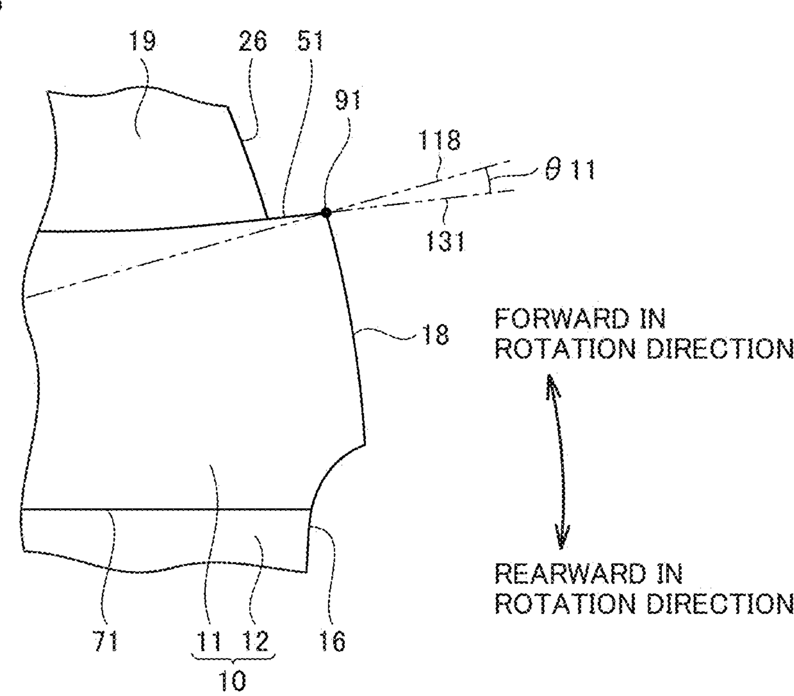
FIG. 8 is an enlarged schematic view illustrating a region VIII in FIG. 3.

FIG. 8 is an enlarged schematic view illustrating a region VIII in FIG. 3. As illustrated in FIG. 8, a tangent line of first cutting edge 51 at first outermost peripheral end 91 as viewed in axial direction 101 is a first tangent line 131. A straight line passing through first outermost peripheral end 91 and axis X (see FIG. 3) as viewed in axial direction 101 is defined as an eighth imaginary line 118.

First tangent line 131 is inclined rearward in the rotation direction with respect to eighth imaginary line 118 as viewed in axial direction 101. An angle which is an acute angle among angles formed by first tangent line 131 and eighth imaginary line 118 as viewed in axial direction 101 is defined as first rake angle θ11. From another point of view, a rake angle of first cutting edge 51 in the radial direction of drill 100 at outermost peripheral end 91 of first cutting edge 51 is defined as first rake angle θ11. First rake angle θ11 is negative.

The rake angle of the cutting edge in the radial direction of drill 100 being "positive" at the outermost peripheral end of the cutting edge refers to a state in which a tangent line of the cutting edge at the outermost peripheral end is inclined forward in the rotation direction of drill 100 with respect to a straight line passing through axis X and the outermost peripheral end as viewed in axial direction 101. On the contrary, the rake angle of the cutting edge in the radial direction of drill 100 being "negative" at the outermost peripheral end of the cutting edge refers to a state in which a tangent line of the cutting edge at the outermost peripheral end is inclined rearward in the rotation direction of drill 100 with respect to a straight line passing through axis X and the outermost peripheral end as viewed in axial direction 101.

First rake angle θ11 is, for example, greater than or equal to −18° and less than or equal to −9°. First rake angle θ11 may be, for example, greater than or equal to −14° and less than or equal to −10°. The lower limit of first rake angle θ11 is not particularly limited, but may be, for example, greater than or equal to −16°, or greater than or equal to −13° The upper limit of first rake angle θ11 is not particularly limited, but may be, for example, less than or equal to −9.5°, or less than or equal to −11°. First margin face 18 is provided radially outward with respect to each of first flank face 10, first outer peripheral surface portion 16, and second outer peripheral surface portion 26 as viewed in axial direction 101. First margin face 18 is provided forwardly of first outer peripheral surface portion 16 in the rotation direction as viewed in axial direction 101.

Figure 9:
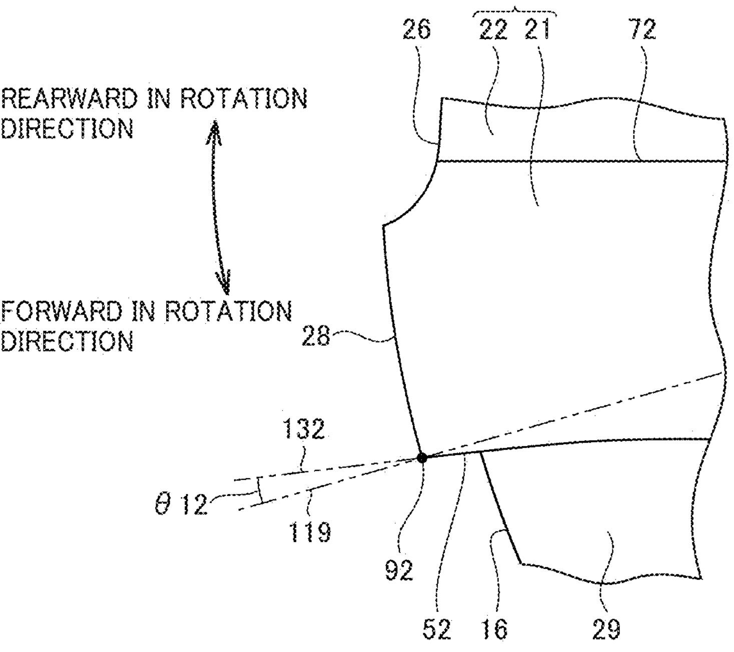
FIG. 9 is an enlarged schematic view illustrating a region IX in FIG. 3.

FIG. 9 is an enlarged schematic view illustrating a region IX in FIG. 3. As illustrated in FIG. 9, a tangent line of second cutting edge 52 at second outermost peripheral end 92 as viewed in axial direction 101 is a second tangent line 132. A straight line passing through second outermost peripheral end 92 and axis X (see FIG. 3) as viewed in axial direction 101 is defined as a ninth imaginary line 119. Ninth imaginary line 119 may overlap eighth imaginary line 118 (see FIG. 8) as viewed in axial direction 101.

Second tangent line 132 is inclined rearward in the rotation direction with respect to ninth imaginary line 119 as viewed in axial direction 101. An angle which is an acute angle among angles formed by second tangent line 132 and ninth imaginary line 119 as viewed in axial direction 101 is defined as second rake angle θ12. From another point of view, a rake angle of second cutting edge 52 in the radial direction of drill 100 at outermost peripheral end 92 of second cutting edge 52 is defined as second rake angle θ12. Second rake angle θ12 is negative. Second rake angle θ12 is substantially the same as first rake angle θ11.

Second rake angle θ12 is, for example, greater than or equal to −18° and less than or equal to −9°. Second rake angle θ12 may be, for example, greater than or equal to −14° and less than or equal to −10°. The lower limit of second rake angle θ12 is not particularly limited, but may be, for example, greater than or equal to −16°, or greater than or equal to −13°. The upper limit of second rake angle θ12 is not particularly limited, but may be, for example, less than or equal to −9.5°, or less than or equal to −110 Second margin face 28 is provided radially outward with respect to each of second flank face 20, first outer peripheral surface portion 16, and second outer peripheral surface portion 26 as viewed in axial direction 101. Second margin face 28 is provided forwardly of second outer peripheral surface portion 26 in the rotation direction as viewed in axial direction 101.

Next, functions and effects of drill 100 according to the present embodiment will be described.

Drill 100 according to the present embodiment includes first chisel region 41, second chisel region 42, and third chisel region 43. Third chisel region 43 is contiguous to each of first chisel region 41 and second chisel region 42. Third chisel region 43 is provided at front end 1. Therefore, when the workpiece is machined using drill 100, third chisel region 43 first comes into contact with the workpiece. In drill 100 according to the present embodiment, the distance (first distance E1) between first ridgeline 71 and second ridgeline 72 is less than or equal to 0.03 mm. The shortest distance (second distance E2) between first thinning ridgeline 15 and second thinning ridgeline 25 in a direction perpendicular to first ridgeline 71 as viewed in axial direction 101 is less than or equal to 0.10 mm.

By setting first distance E1 to be less than or equal to 0.03 mm, it is possible to suppress an excessive increase in the length of third chisel region 43. This makes it possible to suppress an excessive increase in the contact area between drill 100 and the workpiece immediately after the start of drilling using drill 100. Therefore, the biting performance of drill 100 can be improved. Accordingly, it is possible to suppress runout of drill 100 at the time of drilling. Thus, it is possible to improve each of the hole diameter enlargement and the hole positional tolerance of the hole machined using drill 100. As a result, the accuracy of drilling can be improved. By setting second distance E2 to be less than or equal to 0.10 mm, it is possible to suppress an excessive increase in the length of each of first chisel region 41 and second chisel region 42. Accordingly, it is possible to suppress an excessive increase in the force applied from the workpiece to each of first chisel region 41 and second chisel region 42 at the initial stage of drilling. Thus, the runout of drill 100 at the time of drilling can be prevented. As a result, the accuracy of drilling can be improved.

In addition, in drill 100 according to the present embodiment, first distance E1 is larger than 0 mm. Second distance E2 is greater than or equal to 0.04 mm. Setting first distance E1 to be larger than 0 mm makes it possible to suppress an excessive increase in sharpness of the periphery of front end 1 of drill 100. Therefore, the periphery of front end 1 of drill 100 can be prevented from being chipped. As a result, the strength of drill 100 can be increased. Setting second distance E2 to be greater than or equal to 0.04 mm makes it possible to increase the thickness of drill 100 around front end 1. This can prevent drill 100 from being broken. As a result, the strength of drill 100 can be increased.

In drill 100 according to the present embodiment, the length (third length L3) of third chisel region 43 may be greater than or equal to 23% and less than or equal to 55% of second distance E2. With this configuration, the hole positional tolerance of the hole formed using drill 100 can be improved.

In drill 100 according to the present embodiment, edge diameter D of drill 100 may be less than or equal to 3 mm. Commonly, during machining using drill 100 having small edge diameter D, an oily coolant is often supplied by external oil supply. In this case, the temperature of drill 100 tends to be higher as compared with the case where the coolant is supplied by internal oil supply. Therefore, drill 100 having small edge diameter D often has two (a pair of) margin faces in order to reduce friction between drill 100 and the workpiece. In this case, drill 100 is likely to run out as compared with the case of having four or more (two or more pairs of) margin faces. As a result, the accuracy of drilling can be reduced. Drill 100 according to the present embodiment can suppress a decrease in accuracy of drilling even when edge diameter D is less than or equal to 3 mm.

Figure 10:
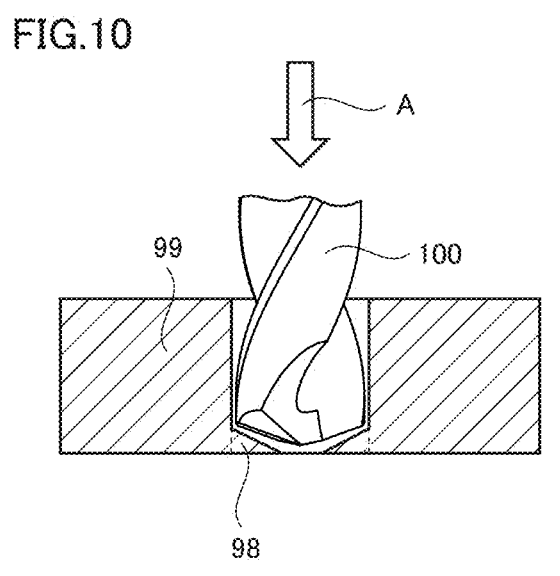
Figure 11:
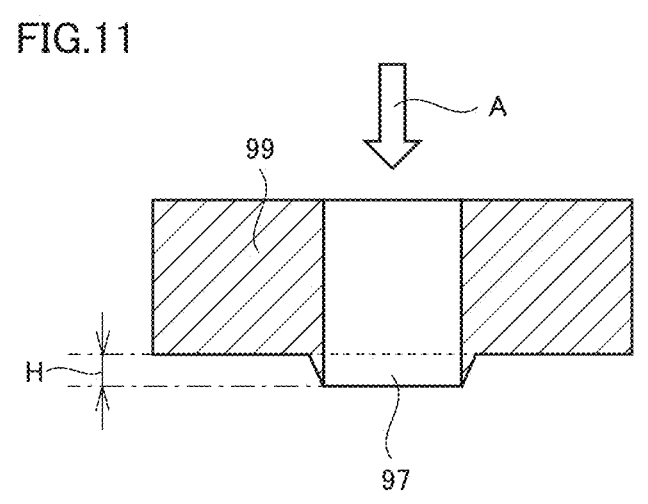

FIG. 10 is a schematic cross-sectional view illustrating a state immediately before drill 100 penetrates the workpiece. As illustrated in FIG. 10, a remaining portion 98 of a workpiece 99 is formed immediately before drill 100 penetrates workpiece 99 at the time of drilling. Remaining portion 98 is a part that is not cut by the cutting edge of drill 100. FIG. 11 is a schematic cross-sectional view illustrating a state in which a hole is formed in workpiece 99 using drill 100. As illustrated in FIGS. 10 and 11, when drill 100 penetrates workpiece 99, remaining portion 98 receives a load in a direction along a machining direction A of drill 100. Due to the load, remaining portion 98 is plastically deformed. As a result, a burr 97 is formed in workpiece 99. In machining direction A of drill 100, a distance between a point on burr 97 farthest from the surface of workpiece 99 and the surface of workpiece 99 is defined as a height H of burr 97. Height H of burr 97 is preferably low.

In drill 100 according to the present embodiment, the rake angle (first rake angle θ11) of first cutting edge 51 in the radial direction of drill 100 at first outermost peripheral end 91 may be greater than or equal to −18° and less than or equal to −9° The rake angle (second rake angle θ12) of second cutting edge 52 in the radial direction of drill 100 at second outermost peripheral end 92 may be greater than or equal to −18° and less than or equal to −9°. By setting each of first rake angle θ11 and second rake angle θ12 to be greater than or equal to −18°, the sharpness of the cutting edge at the outermost peripheral end can be improved. As a result, height H of burr 97 can be reduced.

In addition, by setting each of first rake angle θ11 and second rake angle θ12 to be less than or equal to −9°, a decrease in strength of the cutting edge around the outermost peripheral end can be prevented. Thus, even after a plurality of holes is machined using drill 100, a decrease in sharpness due to breakage of the cutting edge can be suppressed. As a result, it is possible to suppress an increase in height H of the burr even after a plurality of holes is machined using drill 100.

Example 1

(Preparation of Samples)

First, drills 100 according to Sample 1 and Sample 2 were prepared. Drill 100 according to Sample 1 was used as Comparative Example. Drill 100 according to Sample 2 was used as Example.

Figure 12:
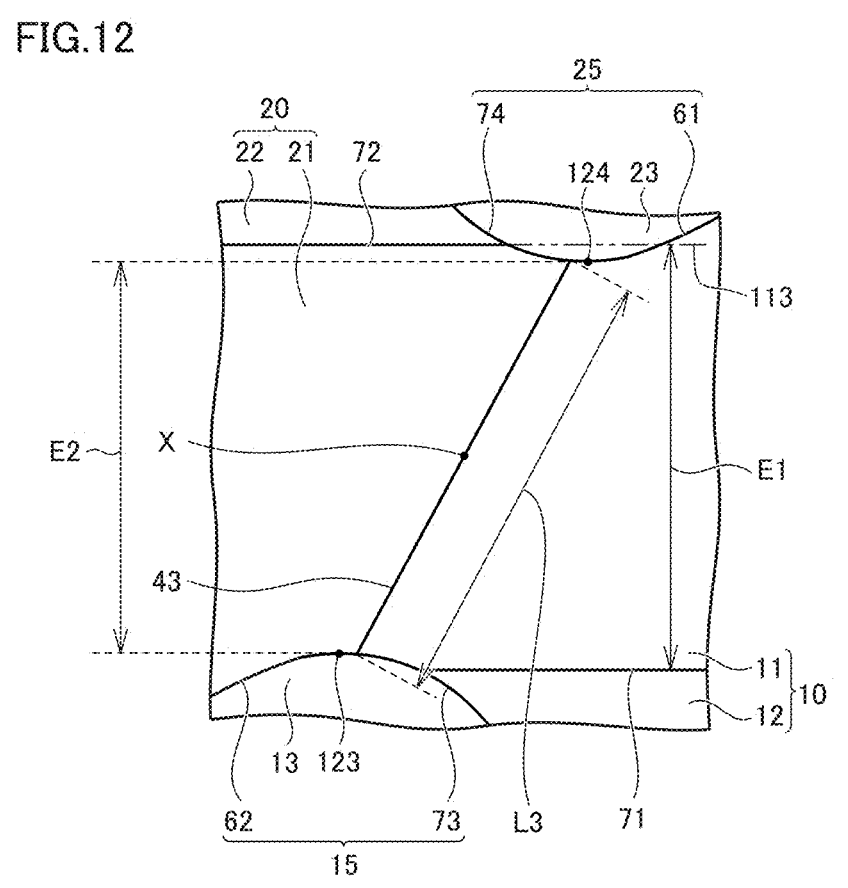

In drills 100 according to Sample 1 and Sample 2, first distances E1 varied. Drill 100 according to Sample 1 had first distance E1 of 0.12 mm. FIG. 12 is an enlarged schematic front view illustrating a configuration of drill 100 according to Sample 1. The enlarged schematic front view illustrated in FIG. 12 corresponds to the enlarged schematic front view illustrated in FIG. 4. As illustrated in FIG. 12, drill 100 according to Sample 1 did not have first chisel region 41 and second chisel region 42. In drill 100 according to Sample 1, the percentage (first value) of the value obtained by dividing the length (third length L3) of third chisel region 43 by second distance E2 was 113%.

Drill 100 according to Sample 2 had the configuration of drill 100 according to the present embodiment (see FIG. 4). The drill according to Sample 2 had first distance E1 of 0.02 mm. The first value was 32%.

Drills 100 according to Sample 1 and Sample 2 each had edge diameter D of 2 mm. The length of each of first chip discharge face 19 and second chip discharge face 29 was set to five times edge diameter D. Second distance E2 was 0.07 mm. Each of first rake angle θ11 and second rake angle θ12 (hereinafter also simply referred to as rake angle) was −12°.

(Evaluation Method)

Next, hole diameter enlargement and hole positional tolerance were evaluated using drills 100 according to Samples 1 and 2. Specifically, a hole was formed in a workpiece using drills 100 according to Sample 1 and Sample 2. The diameter of the formed hole was measured. A value obtained by subtracting the edge diameter of drill 100 from the diameter of the formed hole was taken as the hole diameter enlargement. A value twice the distance between the target position of the center of the hole and the position of the center of the formed hole was taken as the hole positional tolerance.

In the evaluation of the hole diameter enlargement and the hole positional tolerance, SCM415 was used as the workpiece. SCM415 is alloy steel specified in Japanese Industrial Standards (JIS) G 4053:2016. The depth of the hole was 6 mm. The cutting speed was 38 m/min. The feed rate was 0.04 mm per rotation.

(Evaluation Results)

TABLE 1

| | | Sample 1 | Sample 2 |
|---|---|---|---|
| Configuration of drill | First distance [mm] | 0.12 | 0.02 |
| | Second distance [mm] | 0.07 | 0.07 |
| | First value [%] | 113 | 32 |
| | Rake angle [°] | −12 | −12 |
| Hole diameter enlargement [mm] | | 0.068 | 0.008 |
| Hole positional tolerance [mm] | | 0.032 | 0.015 |

Table 1 shows the hole diameter enlargements and the hole positional tolerances of Samples 1 and 2. As shown in Table 1, the hole diameter enlargement of Sample 2 was smaller than the hole diameter enlargement of Sample 1. The hole positional tolerance of Sample 2 was smaller than the hole positional tolerance of Sample 1.

From the above results, it was confirmed that drill 100 according to Example can reduce each of the hole diameter enlargement and the hole positional tolerance as compared with drill 100 according to Comparative Example.

Example 2

(Preparation of Samples)

Next, drills 100 according to Samples 3 to 7 were prepared. Drills 100 according to Samples 3, 6, and 7 were used as Comparative Examples. Drills 100 according to Samples 4 and 5 were used as Examples.

In drills 100 according to Samples 3 to 7, first distances E1 varied. In drills 100 according to Samples 3 to 7, the first distances E1 were set to be greater than or equal to 0 mm and less than or equal to 0.10 mm. The first value was set to be greater than or equal to 0% and less than or equal to 113%.

Drills 100 according to Samples 3 to 7 each had edge diameter 1) of 2 mm. The length of each of first chip discharge face 19 and second chip discharge face 29 was set to five times edge diameter D. Second distance E2 was 0.08 mm. The rake angle was −12°.

(Evaluation Method)

Next, the bite shape was evaluated using drills 100 according to Samples 3 to 7. Specifically, a hole was formed in a workpiece using drills 100 according to Samples 3 to 7. The depth of the hole was approximately 0.3 mm. In the portion of the workpiece with which drill 100 was in contact, the shape of the mark (bite shape) formed by contact with drill 100 was confirmed. When the biting performance of drill 100 is good, the bite shape is circular. In the evaluation of the bite shape, SCM415 was used as the workpiece. The cutting speed was 38 m/min. The feed rate was 0.04 mm per rotation.

The hole diameter enlargements and the hole positional tolerances were evaluated using drills 100 according to Samples 3 to 7. Specifically, each of the hole diameter enlargement and the hole positional tolerance was measured using the above-described evaluation method.

The number of machined holes machined by each of drills 100 according to Samples 3 to 7 was evaluated. Specifically, multiple holes were formed in the workpiece using drills 100 according to Samples 3 to 7. The number of holes was 600 at maximum. When the damage of drill 100 was confirmed, the number of holes formed until the damage was confirmed was measured as the number of machined holes. When no damage of drill 100 was confirmed, the number of machined holes was determined as 600. In the evaluation of the number of machined holes, SCM415 was used as the workpiece. The depth of the hole was 6 mm. The cutting speed was 38 m/min. The feed rate was 0.04 mm per rotation.

(Evaluation Results)

TABLE 2

| | | Sample 3 | Sample 4 | Sample 5 | Sample 6 | Sample 7 |
|---|---|---|---|---|---|---|
| Configuration of drill | First distance [mm] | 0 | 0.02 | 0.03 | 0.05 | 0.10 |
| | Second distance [mm] | 0.08 | 0.08 | 0.08 | 0.08 | 0.08 |
| | First vanue [%] | 0 | 28 | 42 | 70 | 113 |
| | Rake angle [°] | −12 | −12 | −12 | −12 | −12 |
| Bite shape | | Circular | Circular | Circular | Irregular | Irregular |
| Hole diameter enlargement [mm] | | 0.014 | 0.015 | 0.018 | 0.028 | 0.044 |
| Hole positional tolerance [mm] | | 0.015 | 0.016 | 0.016 | 0.021 | 0.028 |
| Number of machined holes | | 126 (broken) | 600 | 600 | 600 | 600 |

Table 2 shows the bite shapes, the hole diameter enlargements, the hole positional tolerances, and the numbers of machined holes of Samples 3 to 7. As shown in Table 2, the bite shape was circular when first distance E1 was less than or equal to 0.03 mm (Samples 3 to 5). When first distance E1 was greater than or equal to 0.05 mm (Samples 6 and 7), the bite shape was irregular Specifically, the bite shape was triangular.

As shown in Table 2, when first distance E1 was less than or equal to 0.03 mm (Samples 3 to 5), the hole diameter enlargement was less than or equal to 0.018 mm. The hole positional tolerance was less than or equal to 0.016 mm. When first distance E1 was greater than or equal to 0.05 mm (Samples 6 and 7), the hole diameter enlargement was greater than or equal to 0.028 mm. The hole positional tolerance was greater than or equal to 0.021 mm.

As shown in Table 2, the number of machined holes was 126 when first distance E1 was 0 mm (Sample 3). Specifically, in Sample 3, a breakage was confirmed around front end 1 of drill 100. When first distance E1 was greater than 0 mm (Samples 4 to 7), the number of machined holes was 600. In other words, no breakage of drills 100 was observed in Samples 4 to 7.

From the above results, it was confirmed that drill 100 according to Example can improve biting performance, reduce each of the hole diameter enlargement and the hole positional tolerance, and increase the strength of drill 100 as compared with drill 100 according to Comparative Example.

Example 3

(Preparation of Samples)

Next, drills 100 according to Samples 8 to 13 were prepared. Drills 100 according to Samples 8 and 13 were used as Comparative Examples. Drills 100 according to Samples 9 to 12 were used as Examples In drills 100 according to Samples 8 to 13, second distances E2 varied. In drills 100 according to Samples 8 to 13, second distances E2 were set to be greater than or equal to 0.030 mm and less than or equal to 0.110 mm. The first values were set to be greater than or equal to 20% and less than or equal to 74%.

Drills 100 according to Samples 8 to 13 each had edge diameter D of 2 mm. The length of each of first chip discharge face 19 and second chip discharge face 29 was set to five times edge diameter D. First distance E1 was 0.02 mm. The rake angle was −12°.

(Evaluation Method)

Next, the hole diameter enlargements and hole positional tolerances were evaluated using drills 100 according to Samples 8 to 13. Specifically, the hole diameter enlargement, the hole positional tolerance, and the number of machined holes were measured using the above-described evaluation method.

(Evaluation Results)

TABLE 3

| | | Sample 8 | Sample 9 | Sample 10 | Sample 11 | Sample 12 | Sample 13 |
|---|---|---|---|---|---|---|---|
| Configuration of drill | First distance [mm] | 0.02 | 0.02 | 0.02 | 0.02 | 0.02 | 0.02 |
| | Second distance [mm] | 0.030 | 0.040 | 0.055 | 0.083 | 0.100 | 0.110 |
| | First value [%] | 74 | 55 | 40 | 26 | 23 | 20 |
| | Rake angle [°] | −12 | −12 | −12 | −12 | −12 | −12 |
| Hole diameter enlargement [mm] | | 0.016 | 0.015 | 0.012 | 0.008 | 0.014 | 0.019 |
| Hole positional tolerance [mm] | | 0.028 | 0.023 | 0.016 | 0.018 | 0.021 | 0.035 |
| Number of machined holes | | 180 (broken) | 600 | 600 | 600 | 600 | 600 |

Figure 13:
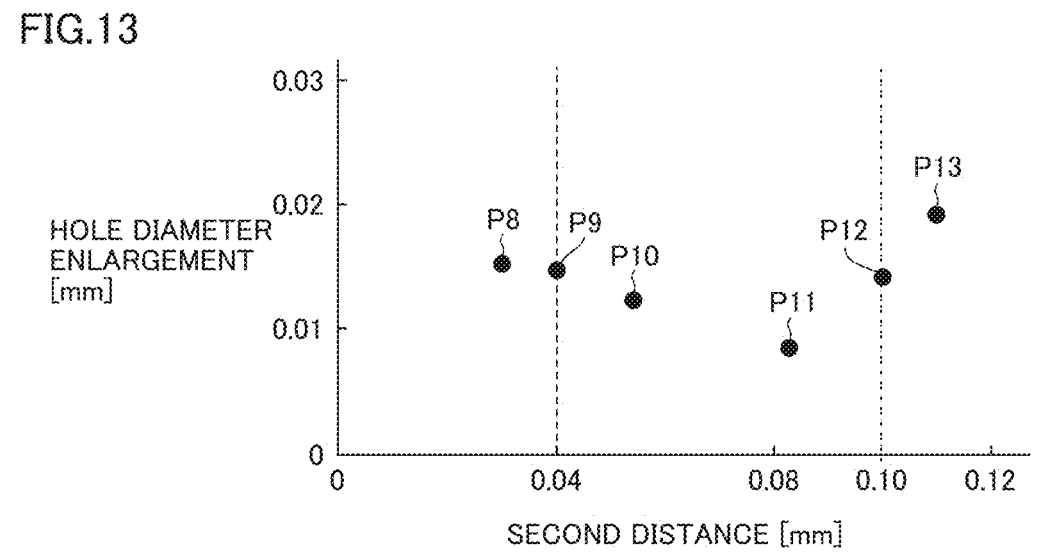

Table 3 shows the hole diameter enlargements, the hole positional tolerances, and the numbers of machined holes of Samples 8 to 13. FIG. 13 illustrates the hole diameter enlargements of Samples 8 to 13. In FIG. 13, the horizontal axis represents second distance E2. The vertical axis represents hole diameter enlargement. In FIG. 13, a point denoted by P8 indicates the hole diameter enlargement of Sample 8. Similarly, points denoted by P9 to P13 indicate the hole diameter enlargements of Samples 9 to 13.

Figure 14:
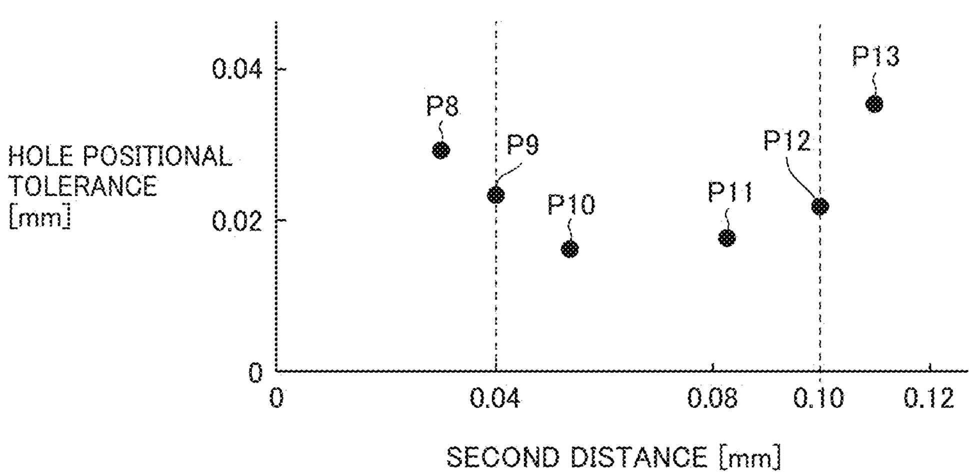
FIG. 14 illustrates hole positional tolerances of Samples 8 to 13.

FIG. 14 illustrates the hole positional tolerances of Samples 8 to 13. In FIG. 14, the horizontal axis represents second distance E2. The vertical axis represents hole positional tolerance in FIG. 14, a point denoted by P8 indicates the hole positional tolerance of Sample 8. Similarly, points denoted by P9 to P13 indicate the hole positional tolerances of Samples 9 to 13.

As shown in Table 3 and FIGS. 13 and 14, when second distance E2 was less than or equal to 0.100 mm (Samples 8 to 12), the hole diameter enlargement was less than or equal to 0.016 mm. The hole positional tolerance was less than or equal to 0.028 mm. When second distance E2 was greater than or equal to 0.110 mm (Sample 13), the hole diameter enlargement was 0.019 mm. The hole positional tolerance was 0.035 mm.

As shown in Table 3, the number of machined holes was 180 when second distance E2 was 0.03 mm (Sample 8). Specifically, in Sample 8, a breakage of drill 100 was confirmed. When second distance E2 was greater than or equal to 0.04 mm (Samples 9 to 13), the number of machined holes was 600 In other words, no breakage of drills 100 was observed in Samples 9 to 13.

From the above results, it was confirmed that drill 100 according to Example can reduce each of the hole diameter enlargement and the hole positional tolerance, and increase the strength of drill 100 as compared with drill 100 according to Comparative Example.

Example 4

Preparation of Samples

Next, drills 100 according to Samples 14 to 20 were prepared. Drills 100 according to Samples 14, 15, and 20 were used as Comparative Examples. Drills 100 according to Samples 16 to 19 were used as Examples.

In drills 100 according to Samples 14 to 20, the percentages (first values) of the values obtained by dividing the lengths of third chisel regions 43 by second distances E2 varied. In drills 100 according to Samples 14 to 20, the first values were set to be greater than or equal to 15% and less than or equal to 75%. Second distances E2 were greater than or equal to 0.030 mm and less than or equal to 0.150 mm.

Drills 100 according to Samples 14 to 20 each had edge diameter D of 2 mm. The length of each of first chip discharge face 19 and second chip discharge face 29 was set to five times edge diameter D. First distance E1 was 0.02 mm. The rake angle was −12°.

Evaluation Method

Next, the hole diameter enlargement and hole positional tolerance were evaluated using drills 100 according to Samples 14 to 20. Specifically, the hole diameter enlargement, the hole positional tolerance, and the number of machined holes were measured using the above-described evaluation method.

Evaluation Results

TABLE 4

| | | Sample 14 | Sample 15 | Sample 16 | Sample 17 | Sample 18 | Sample 19 | Sample 20 |
|---|---|---|---|---|---|---|---|---|
| Configuration of drill | First distance [mm] | 0.02 | 0.02 | 0.02 | 0.02 | 0.02 | 0.02 | 0.02 |
| | Second distance [mm] | 0.030 | 0.035 | 0.041 | 0.055 | 0.075 | 0.100 | 0.150 |
| | First value [%] | 75 | 64 | 55 | 41 | 30 | 23 | 15 |
| | Rake angle [°] | −12 | −12 | −12 | −12 | −12 | −12 | −12 |
| Hole diameter enlargement [mm] | | 0.016 | 0.015 | 0.015 | 0.012 | 0.01 | 0.014 | 0.019 |
| Hole positional tolerance [mm] | | 0.028 | 0.026 | 0.023 | 0.016 | 0.017 | 0.021 | 0.035 |
| Number of machined holes | | 180 (broken) | 600 | 600 | 600 | 600 | 600 | 600 |

Figure 15:
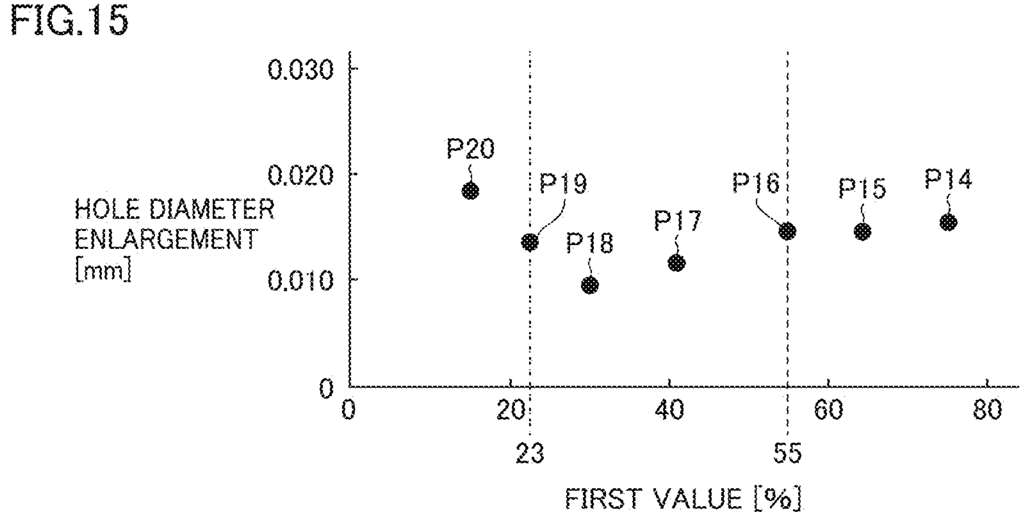
FIG. 15 illustrates hole diameter enlargements of Samples 14 to 20.

Table 4 shows the hole diameter enlargements, the hole positional tolerances, and the numbers of machined holes of Samples 14 to 20. FIG. 15 illustrates the hole diameter enlargements of Samples 14 to 20. In FIG. 15, the horizontal axis represents first value. The vertical axis represents hole diameter enlargement. In FIG. 15, a point denoted by P14 indicates the hole diameter enlargement of Sample 14. Similarly, points denoted by P15 to P20 indicate the hole diameter enlargements of Samples 15 to 20.

Figure 16:
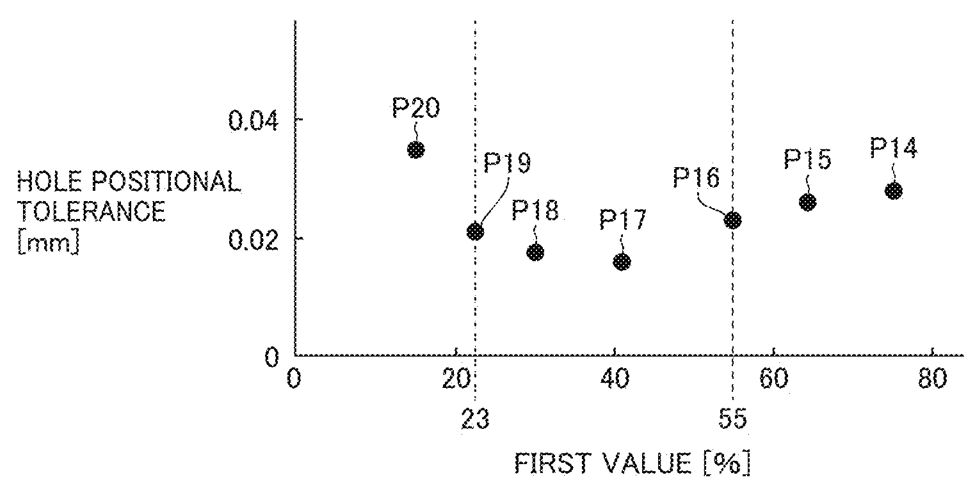
FIG. 16 illustrates hole positional tolerances of Samples 14 to 20.

FIG. 16 illustrates the hole positional tolerances of Samples 14 to 20. In FIG. 16, the horizontal axis represents first value. The vertical axis represents hole positional tolerance. In FIG. 16, a point denoted by P14 indicates the hole positional tolerance of Sample 14. Similarly, points denoted by P15 to P20 indicate the hole positional tolerances of Samples 15 to 20.

As shown in Table 4 and FIG. 15, the hole diameter enlargement when the first value was greater than or equal to 23% and less than or equal to 65% (Samples 15 to 19) was smaller than the hole diameter enlargement when the first value was less than 23% or greater than 65% (Samples 14 and 20). As shown in Table 4 and FIG. 16, the hole positional tolerance when the first value was greater than or equal to 23% and less than or equal to 55% (Samples 16 to 19) was smaller than the hole positional tolerance when the first value was less than 23% or greater than 55% (Samples 14, 15, and 20).

From the above results, it was confirmed that drill 100 according to Example can reduce the hole positional tolerance as compared with drill 100 according to Comparative Example.

Example 5

(Preparation of Samples)

Next, drills 100 according to Samples 21 to 27 were prepared. Drills 100 according to Samples 21 and 27 were used as Comparative Examples. Drills 100 according to Samples 22 to 26 were used as Examples.

In drills 100 according to Samples 21 to 27, the rake angles varied. In drills 100 according to Samples 21 to 27, the rake angles were set to be greater than or equal to −24° and less than or equal to −6°.

Drills 100 according to Samples 21 to 27 each had edge diameter D of 2 mm. The length of each of first chip discharge face 19 and second chip discharge face 29 was set to five times edge diameter D. First distance E1 was 0.02 mm Second distance E2 was 0.08 mm. The first value was 28%.

(Evaluation Method)

Next, height H (see FIG. 11I) of the burr after 300 holes were machined was measured using drills 100 according to Samples 21 to 27. Specifically, in the machining direction of drill 100, a distance between a point on burr 97 farthest from the surface of workpiece 99 and the surface of workpiece 99 was measured as height H of the burr. In the evaluation of height H of the burr, SCM415 was used as the workpiece. The depth of the hole was 6 mm. The cutting speed was 38 m/min. The feed rate was 0.04 mm per rotation.

The hole diameter enlargements, the hole positional tolerances, and the numbers of machined holes were evaluated using drills 100 according to Samples 21 to 27. Specifically, the hole diameter enlargement, the hole positional tolerance, and the number of machined holes were measured using the above-described evaluation method.

(Evaluation Results)

TABLE 5

| | | Sample 21 | Sample 22 | Sample 23 | Sample 24 | Sample 25 | Sample 26 | Sample 27 |
|---|---|---|---|---|---|---|---|---|
| Configuration of drill | First distance [mm] | 0.02 | 0.02 | 0.02 | 0.02 | 0.02 | 0.02 | 0.02 |
| | Second distance [mm] | 0.08 | 0.08 | 0.08 | 0.08 | 0.08 | 0.08 | 0.08 |
| | First value [%] | 28 | 28 | 28 | 28 | 28 | 28 | 28 |
| | Rake angle [°] | −6 | −9 | −10 | −12 | −14 | −18 | −24 |
| Hole diameter enlargement [mm] | | 0.016 | 0.014 | 0.015 | 0.015 | 0.016 | 0.014 | 0.015 |
| Hole positional tolerance [mm] | | 0.016 | 0.015 | 0.014 | 0.016 | 0.017 | 0.015 | 0.016 |
| Height of burr [mm] | | 0.102 | 0.068 | 0.059 | 0.051 | 0.062 | 0.073 | 0.096 |
| Number of machined holes | | 600 | 600 | 600 | 600 | 600 | 600 | 600 |

Table 5 shows the hole diameter enlargements, the hole positional tolerances, heights H of burrs, and the numbers of machined holes by drills 100 according to Samples 21 to 27.

As shown in Table 5, height H of the burr when the rake angle was greater than or equal to −18° and less than or equal to −9° (Samples 22 to 26) was smaller than height H of the burr when the rake angle was less than −18° or greater than −9°(Samples 21 and 27).

From the above results, it was confirmed that drill 100 according to Example can reduce height F1 of burrs as compared with drill 100 according to Comparative Example.

The embodiment and examples disclosed herein are to be considered in all respects as illustrative and not restrictive. The scope of the present invention is indicated by the appended claims rather than by the foregoing descriptions, and is intended to include all modifications within the meanings and ranges equivalent to the claims.

REFERENCE SIGNS LIST

1: front end, 2: rear end, 7: shank, 9: outer peripheral surface, 10: first flank face, 11: first front flank face portion, 12: first rear flank face portion, 13: first thinning face, 15: first thinning ridgeline. 16: first outer peripheral surface portion, 17: first leading edge, 18: first margin face, 19: first chip discharge face, 20: second flank face, 21: second front flank face portion, 22: second rear flank face portion, 23: second thinning face, 25: second thinning ridgeline, 26: second outer peripheral surface portion, 27: second leading edge, 28: second margin face, 29: second chip discharge face, 41: first chisel region, 42: second chisel region, 43: third chisel region, 51: first cutting edge, 52: second cutting edge, 61: first thinning cutting edge, 62: second thinning cutting edge, 71: first ridgeline, 72: second ridgeline, 73 third ridgeline, 74: fourth ridgeline, 75: fifth ridgeline, 76: sixth ridgeline, 81: first end, 82: second end, 91: first outermost peripheral end, 92: second outermost peripheral end, 93: first chip discharge flute, 94: second chip discharge flute, 97: burr, 98: remaining portion, 99: workpiece, 100: drill, 101: axial direction, 102: side view direction, 111: first imaginary line, 112: second imaginary line, 113: third imaginary line, 114: fourth imaginary line, 115: fifth imaginary line, 116: sixth imaginary line, 117: seventh imaginary line, 118: eighth imaginary line, 119: ninth imaginary line, 121: first point, 122: second point, 123: third point, 124: fourth point, 131 first tangent line, 132: second tangent line, A: machining direction, CS1: first cross section, CS2: second cross section, D: edge diameter, E1: first distance (distance), E2: second distance (shortest distance), H: height, L1: first length, L2: second length, L3: third length, X: axis, θ1: first angle, θ2: second angle, θ3: third angle, θ4: fourth angle, θ5: fifth angle, θ6: sixth angle, θ11: first rake angle, θ12: second rake angle

The invention claimed is:

1. A drill that rotates around an axis, the drill comprising:

a first flank face;

a first thinning face provided rearwardly of the first flank face in a rotation direction;

a second flank face provided rearwardly of the first thinning face in the rotation direction; and a second thinning face provided rearwardly of the second flank face in the rotation direction, wherein the first flank face includes a first front flank face portion, and a first rear flank face portion that is contiguous to the first front flank face portion, is inclined with respect to the first front flank face portion, and is provided rearwardly of the first front flank face portion in the rotation direction, the second flank face includes a second front flank face portion, and a second rear flank face portion that is contiguous to the second front flank face portion, is inclined with respect to the second front flank face portion, and is provided rearwardly of the second front flank face portion in the rotation direction, the second front flank face portion is contiguous to each of the first front flank face portion and the first rear flank face portion, the second rear flank face portion is contiguous to the first front flank face portion, when a ridgeline between the first front flank face portion and the first rear flank face portion is defined as a first ridgeline, and a ridgeline between the second front flank face portion and the second rear flank face portion is defined as a second ridgeline, a distance between the first ridgeline and the second ridgeline in a direction perpendicular to the first ridgeline as viewed in an axial direction from a front end toward a rear end of the drill is greater than 0 mm and less than or equal to 0.03 mm, a ridgeline between the first front flank face portion and the second rear flank face portion constitutes a first chisel region, a ridgeline between the first rear flank face portion and the second front flank face portion constitutes a second chisel region, a ridgeline between the first front flank face portion and the second front flank face portion constitutes a third chisel region contiguous to each of the first chisel region and the second chisel region, the third chisel region is provided at the front end, a ridgeline between the first thinning face and the first flank face and a ridgeline between the first thinning face and the second flank face constitute a first thinning ridgeline, a ridgeline between the second thinning face and the first flank face and a ridgeline between the second thinning face and the second flank face constitute a second thinning ridgeline, and a shortest distance between the first thinning ridgeline and the second thinning ridgeline in a direction perpendicular to the first ridgeline as viewed in the axial direction is greater than or equal to 0.04 mm and less than or equal to 0.10 mm.

2. The drill according to claim 1, wherein the third chisel region has a length that is greater than or equal to 23% and less than or equal to 55% of the shortest distance as viewed in the axial direction.

3. The drill according to claim 2, wherein an angle formed by the first ridgeline and the third chisel region as viewed in the axial direction is greater than or equal to 50° and less than or equal to 80°.

4. The drill according to claim 2, wherein an angle formed by the first ridgeline and the first chisel region as viewed in the axial direction is greater than or equal to 40° and less than or equal to 60°, and an angle formed by the first ridgeline and the second chisel region as viewed in the axial direction is greater than or equal to 40° and less than or equal to 60°.

5. The drill according to claim 1, wherein the drill has an edge diameter of less than or equal to 3 mm.

6. The drill according to claim 5, wherein an angle formed by the first ridgeline and the third chisel region as viewed in the axial direction is greater than or equal to 50° and less than or equal to 80°.

7. The drill according to claim 5, wherein
an angle formed by the first ridgeline and the first chisel region as viewed in the axial direction is greater than or equal to 40° and less than or equal to 60°, and
an angle formed by the first ridgeline and the second chisel region as viewed in the axial direction is greater than or equal to 40° and less than or equal to 60°.

8. The drill according to claim 5, further comprising:
a first chip discharge face helically provided around the axis and contiguous to the first flank face, and
a second chip discharge face helically provided around the axis and contiguous to the second flank face, wherein
each of the first chip discharge face and the second chip discharge face constitutes a chip discharge flute, and
a length of each of the first chip discharge face and the second chip discharge face in the axial direction is greater than or equal to 2 times and less than or equal to 10 times the edge diameter.

9. The drill according to claim 8, wherein an angle formed by the first ridgeline and the third chisel region as viewed in the axial direction is greater than or equal to 50° and less than or equal to 80°.

10. The drill according to claim 8, wherein
an angle formed by the first ridgeline and the first chisel region as viewed in the axial direction is greater than or equal to 40° and less than or equal to 60°, and
an angle formed by the first ridgeline and the second chisel region as viewed in the axial direction is greater than or equal to 40° and less than or equal to 60°.

11. The drill according to claim 8, wherein
a ridgeline between the first flank face and the first chip discharge face constitutes a first cutting edge,
a ridgeline between the second flank face and the second chip discharge face constitutes a second cutting edge,
a rake angle of the first cutting edge in a radial direction of the drill at an outermost peripheral end of the first cutting edge is greater than or equal to −18° and less than or equal to −9°, and
a rake angle of the second cutting edge in the radial direction of the drill at an outermost peripheral end of the second cutting edge is greater than or equal to −18° and less than or equal to −9°.

12. The drill according to claim 11, wherein an angle formed by the first ridgeline and the third chisel region as viewed in the axial direction is greater than or equal to 50° and less than or equal to 80°.

13. The drill according to claim 11, wherein
an angle formed by the first ridgeline and the first chisel region as viewed in the axial direction is greater than or equal to 40° and less than or equal to 60°, and
an angle formed by the first ridgeline and the second chisel region as viewed in the axial direction is greater than or equal to 40° and less than or equal to 60°.

14. The drill according to claim 1, wherein an angle formed by the first ridgeline and the third chisel region as viewed in the axial direction is larger than an angle formed by the first ridgeline and the first chisel region and larger than an angle formed by the first ridgeline and the second chisel region.

15. The drill according to claim 14, wherein an angle formed by the first ridgeline and the third chisel region as viewed in the axial direction is greater than or equal to 50° and less than or equal to 80°.

16. The drill according to claim 14, wherein
an angle formed by the first ridgeline and the first chisel region as viewed in the axial direction is greater than or equal to 40° and less than or equal to 60°, and
an angle formed by the first ridgeline and the second chisel region as viewed in the axial direction is greater than or equal to 40° and less than or equal to 60°.

17. The drill according to claim 1, wherein an angle formed by the first ridgeline and the third chisel region as viewed in the axial direction is greater than or equal to 50° and less than or equal to 80°.

18. The drill according to claim 17, wherein
an angle formed by the first ridgeline and the first chisel region as viewed in the axial direction is greater than or equal to 40° and less than or equal to 60°, and
an angle formed by the first ridgeline and the second chisel region as viewed in the axial direction is greater than or equal to 40° and less than or equal to 60°.

19. The drill according to claim 1, wherein
an angle formed by the first ridgeline and the first chisel region as viewed in the axial direction is greater than or equal to 40° and less than or equal to 60°, and
an angle formed by the first ridgeline and the second chisel region as viewed in the axial direction is greater than or equal to 40° and less than or equal to 60°.

* * * * *